United States Patent [19]

Zerfass et al.

[11] Patent Number: 4,741,965
[45] Date of Patent: May 3, 1988

[54] IMPREGNATED SOFT SUBSTANCE GASKET

[75] Inventors: Hans-Rainer Zerfass, Burscheid; Franz-Josef Giesen, Odenthal, both of Fed. Rep. of Germany

[73] Assignee: Goetze AG, Burscheid, Fed. Rep. of Germany

[21] Appl. No.: 940,397

[22] Filed: Dec. 11, 1986

[30] Foreign Application Priority Data

Dec. 18, 1985 [DE] Fed. Rep. of Germany ....... 3544740

[51] Int. Cl.$^4$ .................. B32B 9/04; B32B 27/04; D04H 1/64
[52] U.S. Cl. .................................. 428/447; 428/290; 277/235 A; 277/DIG. 6
[58] Field of Search ......... 277/235 A, 235 B, DIG. 6; 428/447, 290; 427/301, 302, 387

[56] References Cited

U.S. PATENT DOCUMENTS

| | | | |
|---|---|---|---|
| 3,970,322 | 7/1976 | Stecher et al. | 277/235 A |
| 4,071,644 | 1/1978 | Grenoble et al. | 427/302 |
| 4,082,726 | 4/1978 | Mine et al. | 428/447 X |
| 4,322,518 | 3/1982 | Blizzard | 427/387 X |
| 4,416,917 | 11/1983 | France et al. | 427/302 |
| 4,483,539 | 11/1984 | Bindel et al. | 277/235 B |

FOREIGN PATENT DOCUMENTS

| | | |
|---|---|---|
| 3245664 | 4/1983 | Fed. Rep. of Germany . |
| 3317501 | 5/1984 | Fed. Rep. of Germany . |
| 3544740 | 6/1987 | Fed. Rep. of Germany . |
| 99255 | 8/1978 | Japan .............. 277/DIG. 6 |

*Primary Examiner*—John E. Kittle
*Assistant Examiner*—Susan S. Rucker
*Attorney, Agent, or Firm*—Spencer & Frank

[57] ABSTRACT

A soft substance gasket material preferably made of a metal reinforced fiber mat is impregnated with a silicone impregnating agent comprising a mixture of a polysiloxane having reactive hydrogen groups such as a polyhydrogen siloxane, an addition cross-linking polysiloxane such as a methyl vinyl siloxane, and cross-linking catalysts, preferably in the form of only one organic metal compound. In spite of having small quantities of addition cross-linking polysiloxane and cross-linking catalysts, the impregnated seals are not tacky after cross-linking, they are easy and inexpensive to manufacture, and they evidence improved functional characteristics such as improved resistance to hot media, temperature and aging when compared with seals impregnated with only one type of polysiloxane.

19 Claims, No Drawings

IMPREGNATED SOFT SUBSTANCE GASKET

BACKGROUND OF THE INVENTION

1. Field of the Invention

The present invention relates to an impregnated soft substance gasket preferably composed of a metal-reinforced fiber mat, such as an impregnated cylinder head gasket, an exhaust flange gasket or an ancillary seal for internal-combustion engines. This invention also relates to an impregnating agent based on a cross-linkable silicone for impregnating the gasket.

2. Description of the Background

Soft substance cylinder head gaskets for internal-combustion engines are customarily impregnated. This is done primarily to improve their service life and sealing quality as well as to increase their strength.

According to U.S. Pat. No. 3,970,322, such impregnating agents are composed of liquid polybutadiene, polyacrylates and compositions including isocyanates or epoxides. The impregnating agents are preferably thermally cross-linked in the impregnated sealing plate, possibly with the addition of cross-linking agents.

Liquid silicone systems are also known which cross-link into silicones having primarily good resistance to the media to be sealed, to the influence of temperatures and to aging. This is preferably attained with the addition of metal salt catalysts. Such cross-linkable liquid silicones can also be used to impregnate soft substance cylinder head gaskets.

According to DE-OS No. 3,245,664, liquid silicones capable of polyaddition can serve as impregnating agents. Examples of these silicones can be cited such as a polymethyl vinyl siloxane which cross-links after the addition of a platinum complex compound. However, these platinum complexes are poisoned primarily by amine or sulfur compounds and thus lose their effectiveness.

According to DE-OS No. 3,245,664, fiber mat seals can contain rubber binders which are free of amines and sulfur so as to permit the impregnating agent to be sufficiently cross-linked. Such fiber mat seals, however, are relatively expensive to manufacture for special seals.

It is also expensive to produoe fiber mat materials which are either free of asbestos or if the mat materials contain asbestos, the asbestos are free of amines or sulfur compounds and other catalyst poisons.

According to DE-OS No. 3,317,501, polysiloxane systems containing reactive and cross-linkable hydrogen groups such as methyl hydrogen polysiloxanes are also used to impregnate soft substance cylinder head gaskets. The cross-linking in the impregnated seal then takes place primarily by using compounds such as organic tin, aluminum or lead salts. However, even after the cross-linking, the cross-linked siloxanes still contain a percentage of polysiloxane having unbound and reactive hydrogen groups which may then continue to react in the finished seal.

Primarily occurring in the surface of the seal, such postreactions may occur with the materials with which they are in contact, and the seal then becomes tacky and in an undesirable fashion sticks to the packaging material.

Another particular drawback which occurs in a cylinder head gasket is that after assembly the cylinder head gasket sticks to the metal sealing faces of the engine or to the cylinder head.

According to DE-OS No. 3,317,501, such a seal can therefore be subsequently impregnated or coated in a second process step with a condensation cross-linking polysiloxane resin. Such requirements in a second process step are uneconomical, and coatings over the entire surface area of a seal are usually not necessary at all to assure proper functioning.

SUMMARY OF THE INVENTION

It is therefore an object of the present invention to provide an impregnated gasket and a silicone resin impregnating agent which after cross-linking of the impregnating agent presents no disadvantageous tacky and adhesive characteristics, can be manufactured in a simple and cost efficient manner, and has further improved operational characteristics.

According to the present invention, this is accomplished by a soft substance gasket impregnated with a liquid silicone comprising a mixture of polysiloxanes having reactive hydrogen groups, an addition cross-linking polysiloxane, cross-linking catalysts, and possibly further additives.

Other objects, advantages and features of the present invention will become apparent to those skilled in the art from the following discussion.

DESCRIPTION OF THE PREFERRED EMBODIMENTS

Surprisingly, sealing materials impregnated with the novel mixture to which the impregnating agent was subsequently cross-linked did not exhibit adhesive characteristics. The seals obtained with these materials did not stick. Thus, no undesirable sticking to packaging materials and to the sealing faces were observed after assembly.

The main surprising factor in this connection is that undesirable sticking of the seal containing the cross-linked impregnating agent no longer occurred. This happened even in the presence of small additional quantities of addition cross-linking polysiloxane, preferably amounts between about 30 and 20 weight percent. This finding is surprising since it occurs in spite of the correspondingly high content of polysiloxanes having reactive hydrogen groups.

Even small quantities of addition cross-linking polysiloxanes seem to block and seal the reactive hydrogen groups and thus prevent them from undergoing any further undesirable reactions.

It has also been found that the seals impregnated according to the present invention exhibit primarily improved sliding behavior, improved aging behavior and improved media resistance when compared to seals impregnated solely with polysiloxanes having reactive hydrogen groups.

The preferably employed polysiloxanes having reactive hydrogen groups are composed of a polyhydrogen siloxane. Preferred among the polyhydrogen siloxanes are those having a viscosity between 15 and 30 mPaS.

The addition cross-linking polysiloxane is preferably a vinyl, allyl or acrylate silicone polymer. Preferred among the vinyl, allyl and acrylate silicone polymers are those having a viscosity of about 500 mPaS.

The cross-linking catalysts employed may be between about 1 and 5 weight percent mixtures of platinum complex compounds or organic metal compounds. Among the organic metal compounds preferred are those wherein the metal is selected from the group consisting of lead, aluminum, tin, titanium, zinc, cobalt, zirconium and mixtures thereof, which act accordingly on the addition cross-linking polysiloxane and the reactive hydrogen containing polysiloxane.

Surprisingly, it was found that the organic metal compounds of the second group described above, primarily organic tin compounds alone, were sufficient to simultaneously cross-link both types of polysiloxanes. Thus, according to the present invention it is no longer necessary to use platinum complex catalysts or lower amounts can be used of these catalysts which were previously required to cross-link the addition cross-linking polysiloxanes.

As a consequence thereof, the cross-linking catalysts are no longer easily poisoned by foreign compounds and can thus properly perform their intended functions.

Customarily, the cross-linking catalysts are added directly to the polysiloxane starting mixtures along with possibly further cross-linking additives and other additives in the seal impregnating art.

It has also been found herein that the organic metal compounds can be introduced into the fiber mat by preimpregnation, and this possibly even during the manufacture of the fiber mat.

After drying, the catalyst adheres to the fibers in a finely dispersed manner. It then catalyzes the cross-linking of the polysiloxane introduced in a second process step just as well as if it had been added as customary to the impregnating agent bath. In this manner, the premature start of the reaction or cross-linking of the impregnating agent starting mixture is prevented and thus its becoming unusable too early is also prevented.

Typical impregnating agent starting compositions thus comprise
about 75 to 96 weight percent of a polysiloxane having reactive hydrogen groups such as a methyl hydrogen polysiloxane having a viscosity between 15 and 30 mPaS;
about 3 to 20 weight percent of an addition cross-linking polysiloxane composed preferably of methyl vinyl polysiloxane having a viscosity of 500 mPaS; and
about 1 to 5 weight percent of an organic metal catalyst including lead, aluminum, titanium, zinc, tin, cobalt and/or zirconium, wherein the catalyst is possibly introduced into the fiber mat by pre-impregnation.

Thus, with the present invention it is possible to produce non-sticking resin-impregnated silicone gaskets. The manufacturing process is primarily simple and cost efficient. This is so, due to the fact that the impregnation of the seals takes place in one stage, the impregnating agent used contains as its major component an inexpensive polysiloxane and has low viscosity and thus short impregnating times, and the impregnating agent further provides an optimal saturation of the soft substance and small losses of material after the various impregnating processes.

Other advantages are also apparent when the sealing material is pre-impregnated with the cross-linking catalyst. Large amounts of the polysiloxane starting mixture in a form which is free of the cross-linking catalyst can be used without much risk of rendering the impregnating agent bath unusable. In this manner, which includes a preimpregnation step, it is also possible to manufacture the seals economically by mass production.

The inserted seals of this invention have the positive characteristics of known silicone impregnated seals while at the same time being superior to prior art silicone impregnated seals.

The novel seals primarily exhibit an improved sliding behavior in their surface region. The seals according to the invention also display improved aging behavior, improved sealing behavior, improved resistance primarily to hot oils and coolants, and improved resistance to high temperatures. The latter characteristic results in low hot setting under pressure and high resistance to pressure stresses.

The impregnating agents according to the invention can advantageously be used to impregnate fiber mat gaskets for internal-combustion engines. They can also be used within the scope of the present invention to impregnate other impregnatable soft substance materials for seals or in the textile art.

Having now generally described this invention, the same will be better understood by reference to certain specific examples, which are included herein for purposes of illustration only and are not intended to be limiting of the invention or any embodiment thereof, unless so specified.

EXAMPLES

Example 1

The impregnating agent starting mixture is composed of
90 parts by weight of methyl hydrogen polysiloxane (viscosity 22 mPaS)
6 parts by weight of methyl vinyl polysiloxane (viscosity 500 m PaS); and
4 parts by weight of dibutyl tin dilaurate The impregnating agent starting mixture has a viscosity of 24 mPaS. A metal reinforced asbestos fiber mat is provided having a thickness of 3 mm and being suitable for use as a cylinder head gasket. The reinforced asbestos fiber mat is impregnated by immersion in the impregnating agent bath for two minutes to a pore fill of about 60 volume percent.

After the impregnation, the impregnating agent is cross-linked in a furnace for 2½ minutes at 230° C.

Thereafter, the adhesion, aging, sealing, and flowing behavior of the impregnated material were determined.

The sealing material was clamped into steel flanges and aluminum flanges with a sealing pressure of 5, 10 and 20 N/mm². The sealing material was then stressed once for 24 hours at 150° C. without the influence of any media and once for 100 hours at 90° C. under the influence of cooling water.

The seals did not exhibit any sticking to the sealing faces at low pressure. At high pressure the seals showed only a very slight non-detrimental amount of adhesion.

No significant drop in compressibility could be noted in an aging test of more than 1000 hours at 90° C.

The seals were tight to cooling water and engine oil with a degree of pore fill of only 60 volume percent under up to 6 N/mm² surface pressure.

The flow limit of the material corresponds to the value of a the conventionally impregnated seal.

Example 2

A comparison test was run of a seal impregnated solely with polymethyl hydrogen siloxane. The preparation of the impregnating agent and impregnation of the seal were conducted as in Example 1.

This seal representative of the prior art exhibited strong sticking to the sealing faces already under low stress.

The present disclosure relates to the subject matter disclosed in German patent application No. P 35 44 740.0 of Dec. 18th, 1985, the entire specification of which is incorporated herein by reference.

The invention now being fully described, it will be apparent to one of ordinary skill in the art that many changes and modifications can be made thereto without departing from the spirit or scope of the invention as set forth herein.

What is claimed is:

1. An impregnated soft substance gasket, obtained by the method of:
   mixing a liquid polysiloxane resin having reactive hydrogen groups, an addition cross-linking polysiloxane resin and a cross-linking catalyst to form an impregnating agent, and impregnating a soft substance gasket with said impregnating agent and subsequently cross-linking said resins.

2. The impregnated soft substance gasket of claim 1, wherein
   the impregnating agent further comprises cross-linking aids.

3. The impregnated soft substance gasket of claim 1, wherein
   the gasket is a metal reinforced fiber mat.

4. The gasket of claim 1, wherein
   the addition cross-linking polysiloxane resin is a polysiloxane having double carbon bond groups bound to the silicon atom.

5. The gasket of claim 1, wherein
   the cross-linking catalyst is a mixture of platinum complex compounds and organic metal compounds wherein the metal is selected from the group consisting of zinc, tin, cobalt, lead, aluminum, titanium, zirconium and mixtures thereof.

6. The gasket of claim 1, wherein
   the cross-linking catalyst is an organic metal compound wherein the metal is selected from the group consisting of zinc, tin, cobalt, lead, aluminum, titanium, and zirconium or a mixture thereof.

7. The gasket of claim 1, wherein
   the gasket comprises a mat including fiber material; and further wherein the method comprises adding said cross-linking catalyst into the fiber material while making the mat.

8. The gasket of claim 1, wherein
   the gasket comprises a fiber mat; and further wherein the method comprises precipitating said cross-linking catalyst into the fiber mat prior to the impregnating step.

9. The gasket of claim 1, wherein
   the liquid polysiloxane resin having reactive hydrogen groups is present in an amount between about 75 and 96 wt % of the composition; and
   the addition cross-linking polysiloxane resin is present in an amount between about 3 and 20 wt % of the composition.

10. The gasket of claim 1, wherein
    the cross-linking catalyst is present in an amount between about 1 and 5 wt % of the composition.

11. The gasket of claim 1, wherein
    the polysiloxane resin having reactive hydrogen groups is a methyl hydrogen polysiloxane having a viscosity of between about 15 and 30 mPaS, at room temperature (20° C.).

12. The gasket of claim 1, wherein
    the addition cross-linking polysiloxane resin is a methyl vinyl polysiloxane having a viscosity of between about 300 and 600 mPaS, at room temperature (20° C.).

13. A gasket impregnating agent, comprising
    about 75 to 96 wt % of a polysiloxane having reactive hydrogen groups;
    about 3 to 20 wt % of an addition cross-linking polysiloxane; and
    about 1 to 5 wt % of a cross-linking catalyst.

14. The impregnating agent of claim 13, wherein
    the polysiloxane is methyl hydrogen polysiloxane having a viscosity of about 15 to 30 mPaS, at room temperature (20° C.);
    the addition cross-linking polysiloxane is methyl vinyl polysiloxane having a viscosity of about 500 mPaS, at room temperature (20° C.); and
    the cross-linking catalyst is dibutyl tin dilaurate.

15. The impregnating agent of claim 13, further comprises cross-linking aids.

16. The impregnating agent of claim 13, wherein
    the addition cross-linking polysiloxane is a polysiloxane having double carbon bond groups bound to the silicon atom.

17. The impregnating agent of claim 13, wherein
    the addition cross-linking polysiloxane is a methyl vinyl polysiloxane having a viscosity of between about 300 and 600 mPa, at room temperature (20° C.).

18. The impregnating agent of claim 13, wherein
    the cross-linking catalyst is a mixture of platinum complex compounds and organic metal compounds wherein the metal is selected from the group consisting of zinc, tin, cobalt, lead, aluminum, titanium, zirconium and mixtures thereof.

19. The impregnating agent of claim 13, wherein
    the cross-linking catalyst is an organic metal compound wherein the metal is selected from the group consisting of zinc, tin, cobalt, lead, aluminum, titanium, and zirconium or a mixture thereof.

* * * * *